United States Patent [19]

Fennhoff et al.

[11] Patent Number: 5,162,411
[45] Date of Patent: Nov. 10, 1992

[54] CARBONATES, THEIR PRODUCTION AND THEIR USE AS FLOW AIDS

[75] Inventors: Gerhard Fennhoff, Willich; Uwe Westeppe, Mettmann; Werner Nouverné; Karsten-Josef Idel, both of Krefeld; Edgar Leitz, Dormagen; Ulrich Grigo, Kempen, all of Fed. Rep. of Germany

[73] Assignee: Bayer Aktiengesellschaft, Leverkusen, Fed. Rep. of Germany

[21] Appl. No.: 728,455

[22] Filed: Jul. 11, 1991

[30] Foreign Application Priority Data

Jul. 18, 1990 [DE] Fed. Rep. of Germany ....... 4022752

[51] Int. Cl.$^5$ ................................................ C08K 5/10
[52] U.S. Cl. .................... 524/281; 525/147; 526/281; 526/313; 526/314
[58] Field of Search ............... 524/281; 525/147; 526/281, 313, 314

[56] References Cited

U.S. PATENT DOCUMENTS 4,777,202 10/1988 Inagaki et al. ................. 524/281

Primary Examiner—Joseph L. Schofer
Assistant Examiner—Peter D. Mulcahy
Attorney, Agent, or Firm—Joseph C. Gil; Aron Preis

[57] ABSTRACT

A carbonate corresponding to formula (I)

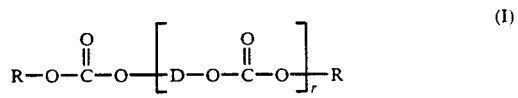

in which R is aromatically bound polystyrene moiety and —O—D—O— is a diphenolate moiety in which —D— is a divalent group containing 6 to 30 carbon atoms and r is 0 or 1 is disclosed. The carbonate is useful as a flow aid for thermoplastic molding compositions.

14 Claims, No Drawings

CARBONATES, THEIR PRODUCTION AND THEIR USE AS FLOW AIDS

This invention relates to new carbonates corresponding to formula (I)

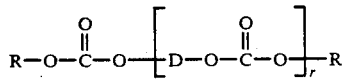

in which
R is an aromatically bound polystyrene moiety and
—O—D—O— is a diphenolate moiety in which
—D— is a twobond group containing 6 to 30 carbon atoms and
r is 0 or 1, where r=1, the $\overline{M}w$ of (I) is below 10,000, $\overline{M}w$ being the weight average molecular weight as determined in known manner by light scattering or gel chromatography after preliminary calibration with styrene.

Aromatically bound polystyrene moieties R are those which are derived from monohydroxyphenyl polystyrenes ROH and which have average number average molecular weights $\overline{M}n$ ($\overline{M}m$ determined by gel permeation chromatography after calibration with styrene) in the range from 1,000 to 50,000, preferably in the range from 2,000 to 35,000 and more preferably in the range from 2,500 to 10,000.

Monohydroxyphenyl polystyrenes of the type in question are prepared, for example, in known manner by anionic polymerization of anionically polymerizable vinyl compounds, subsequent reaction of the monofunctional polymer anion with a hydroxyphenyl vinyl compound, for exmaple with isopropenyl phenol, of which the hydroxy group is masked in known manner, for example by the trimethyl silyl group. The masking group is then eliminated in known manner.

Suitable anionically polymerizable compounds in the context of the invention are, for example, styrene, p-methyl styrene, vinyl pyridine, vinyl naphthalene, isopropenyl naphthalene, 1,3-butadiene, isoprene or mixtures thereof. Preferred anionically polymerizable compounds are styrene, 1,3-butadiene, isoprene or mixtures of styrene/1,3-butadiene and styrene/isoprene.

Preferred monohydroxylphenyl polystyrenes ROH are those corresponding to formula (IIa)

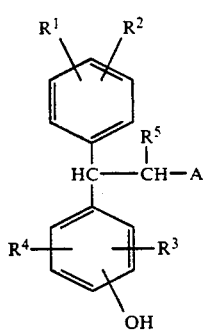

in which
A is a polymer of anionically polymerizable vinyl compounds having an Mn in the range from 1,000 to 50,000, preferably in the range from 2,000 to 35,000 and more preferably in the range from 2,500 to 10,000,
$R^1$ and $R^2$ represent H, $C_{1-4}$ alkyl or $CH_2$—O—,
$R^3$ represents H or $C_{1-4}$ alkyl, O—$C_{1-4}$-alkyl,
$R^4$ represents H, $C_{1-4}$ alkyl and
$R^5$ represents H or $C_{1-4}$ alkyl.

These preferred monohydroxyphenyl polystyrenes corresponding to formula (IIa) and their production are known from the literature (cf. for example Makromol Chem. 190, pages 487 to 493 (1989), EP-OS 0 348 744 and DE-OS 38 21 745 (Le A 26 076)).

Accordingly, preferred carbonates corresponding to formula (I) are those in which R is a moiety having the formula

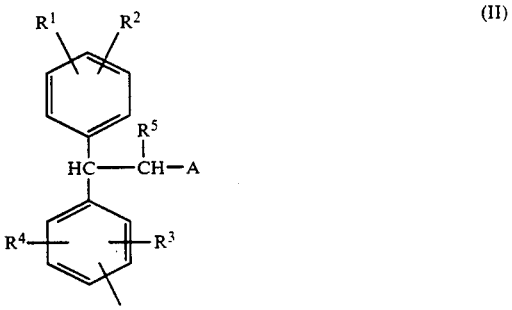

in which A, $R^1$, $R^2$, $R^3$, $R^4$ and $R^5$ are as defined for formula (IIa).

Suitable diphenols HO-D-OH for the production of the carbonates corresponding to formula (I) with r=1 are any diphenols containing 6 to 30 carbon atoms in which the arylene groups —D— may be mononuclear or polynuclear, bridged or fused, suitable bridge members being alkylene groups, alkylidene groups, —CO—, —O—, —S— or —SO$_2$—. The arylene groups may be substituted by alkyl radicals, preferably CH$_3$, or by halogen atoms, preferably Cl or Br.

Preferred diphenols HO-D-OH are, for example, 4,4-bis-(4-hydroxyphenyl)-2-methyl butane, 1,1-bis-(4-hydroxy-phenyl)-p-diisopropylbenzene,2,2-bis-(3-methyl-4-hydroxyphenyl)-propane, 2,2-bis-(3-chloro-4-hydroxyphenyl)-proyl-4-hydroxyphenyl)-sulfone, 2,4-bis-(3,5-dimethyl-4-hydroxyphenyl)-2-methyl butane, 1,1-bis-(3,5-dimethyl-4-hydroxyhydroxyphenyl)-propane, 2,2-bis-(3,5-dibromo-4-hydroxyphenyl)-propane and 1,1-bis-(4-hydroxyphenyl)-3,3,5-trimethyl cyclohexane.

Particularly preferred diphenolate moieties are, for example, those of 2,2-bis-(4-hydroxyphenyl)-propane, 2,2-bis-(3,5-dimethyl-4-hydroxyphenyl)-propane, 2,2-bis-(3,5-hydroxyphenyl)-propane,1,1-bis-(4-hydroxyphenyl)-cyclohexane and 1,1-bis-(4-hydroxyphenyl)-3,3,5-trimethyl cyclohexane.

The diphenols HO-D-OH are either known from the literature or may be obtained by methods known from the literature or are the subject of DE-OS 38 32 396 (Le A 26 344).

The compounds corresponding to formula (I) with r=0 are prepared in known manner by reaction of phosgene with the monohydroxyphenyl polystyrenes ROH by any of the methods typically used for the synthesis of polycarbonates (see for example H. Schnell, "Chemistry and Physics of Polycarbonates", Interscience Publishers, New York, 1964), preferably by the interfacial process, the phosgene being used in excess, based on the quantity of monohydroxyphenyl polystyrene used. The molar ratio of phosgene to monohydroxyphenyl polystyrene is preferably 4:1.

The compounds corresponding to formula (I) in which r=1 are prepared in known manner by reaction of the bis-chlorocarbonic acid esters of the diphenols HO—D—OH

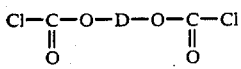

with the monohydroxyphenyl polystryenes ROH by any of the methods typically used for the synthesis of polycarbonates (see H. Schnell, loc. cit.) except the interfacial process. The preferred synthesis is the pyridine process, the molar ratio of bis-chlorocarbonic acid ester to monohydroxyphenyl polystyrene being 1:2.

Accordingly, the present invention also relates to a process for the production of the carbonates corresponding to formula (I) with r=0, characterized in that monohydroxyphenyl polystyrenes ROH, preferably those corresponding to formula (IIa), are reacted with phosgene by the interfacial process using an excess of phosgene, based on the quantity of monohydroxyphenyl polystyrene used, the molar ratio of phosgene to monohydroxyphenyl polystyrene preferably being 4:1.

The present invention also relates to a process for the production of the carbonates corresponding to formula (I) with r=1, characterized in that monohydroxyphenyl polystyrenes ROH, preferably those corresponding to formula (IIa), are reacted with bis-chlorocarbonic acid esters

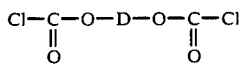

of the diphenols HO—D—OH by the pyridine process, the molar ratio of bis-chlorocarbonic acid esters to monohydroxyphenyl polystyrene being 1:2.

Examples of monohydroxyphenyl polystyrenes having the formula ROH or formula (IIa) are styrene and 4-methyl styrene polymers having Mn values in the range from 1,000 to 50,000, preferably in the range from 2,000 to 35,000 and more preferably in the range from 2,500 to 10,000, Mn being the average number average molecular weight as determined by gel permeation chromatography after calibration with styrene.

The carbonates according to the invention are suitable as flow aids for thermoplastics, more particularly for
1. thermoplastic aromatic polycarbonates
2. thermoplastic aromatic polyesters,
3. thermoplastic aromatic polyester carbonates,
4. thermoplastic polyamides,
5. thermoplastic polyalkylene glycol terephthalates,
6. thermoplastic polyarylene sulfones,
7. thermoplastic aromatic polyether ketones,
8. thermoplastic polyarylene sulfides and
9. thermoplastic polyphenylene oxides.

Mixtures of the above-mentioned thermoplastics with one another and mixtures of the above-mentioned thermoplastics with other thermoplastics, for example mixtures of thermoplastic polycarbonates with
10. styrene polymers or with
11. ABS, i.e. with graft polymers of styrene and acrylonitile on polybutadiene, are also suitable. Mixtures of thermoplastic these are known from the literature.

Accordingly, the present invention also relates to the use of the carbonates of formula (I) according to the invention are flow aids in thermoplastics.

The quantity of carbonate corresponding to formula (I) is between 0.01% by weight and 30% by weight, preferably between 0.5% by weight and 20% by weight and more preferably between 1.0% by weight and 5.0% by weight, based on the total weight of thermoplastic and carbonate corresponding to formula (I).

Accordingly, the present invention also relates to mixtures containing
(A) thermoplastics in quantities of 99.99% by weight to 70% by weight, preferably in quantities of 99.5% by weight to 80% by weight and more preferably in quantities of 99% by weight to 95% by weight and
(B) carbonates corresponding to formula (I) in quantities of 0.01% by weight to 30% by weight, preferably in quantities of 0.5% by weight to 20% by weight and more preferably in quantities of 1% by weight to 5.0% by weight, based on 100% by weight of the sum of (A) thermoplastic and (B) carbonate (I).

Thermoplastics in the context of the invention are, by definition, plastics which, on heating, change from the solid state into the elastic state and finally into the melt. Accordingly, they can be reversibly forme.d by heating and recooling. They may be amorphous or even partly crystalline.

The molecular weight range in which they can be processed as thermoplastics, i.e. the range between an excessively low molecular weight and, hence, brittle consistency and excessively high molecular weight and, hence, no longer softenable consistency depends on the particular composition of the plastics and is familiar to the expert.

1. Thermoplastic aromatic polycarbonates in the context of the invention are the polycondensates obtainable by reaction of diphenols, more particularly dihydroxydiaryl alkanes, with phosgene or diesters of carbonic acid: in addition to the unsubstituted dihydroxydiaryl alkanes, those in which the aryl radicals bear methyl groups or halogen atoms in the o- and/or m-position to the hydroxyl group. Branched polycarbonates are also suitable. Monophenols for example are used as chain terminators while trisphenols or tetraphenols, for example, are used as branching agents.

The polycarbonates have average weight average molecular weights $\overline{M}w$ in the range from 15,000 to 200,000 and preferably in the range from 20,000 to 80,000, as determined by gel permeation chromatography or by measurement of the relative viscosity in $CH_2Cl_2$ at 25° C. and at a concentration of 0.5 g per 100 ml.

Suitable diphenols are, for example, hydroquinone, resorcinol, 4,4'-dihydroxydiphenyl, bis-(hydroxyphenyl)alkanes, such as for example $C_{1-8}$ alkylene or $C_{2-8}$ alkylidene bisphenols, bis-(hydroxyphenyl)-cycloalkanes, such as for example $C_{5-15}$ cycloalkylene or $C_{5-15}$ cycloalkylidene bisphenols, bis-(hydroxyphenyl)-sulfides, ethers, ketones, sulfoxides or sulfones, also $\alpha,\alpha'$-bis-(hydroxyphenyl)diisopropylbenzene and the corresponding nucleus-alkylated and nucleus-halogenated compounds.

Preferred polycarbonates are those based on bis-(4-hydroxyphenyl)-2,2-propane (bisphenol A), bis-(4-hydroxy-3,5-dichlorophenyl)-2,2-propane (tetrachlorobisphenol A) bis-(4-hydroxy-3,5-dibromophenyl)-2,2-propane (tetrabromobisphenol A), bis-(4-hydroxy-3,5-dimethylphenyl)-2,2propane (tetramethyl bisphenol A), bis-(4-hydroxyphenyl)-3,3,5-trimethyl cyclohexane and those based on trinuclear bisphenols, such as α,α'-bis-(4-hydroxyphenyl)-p-diisopropyl benzene. Other suitable diphenols and the production of the polycarbonates are described, for example, in U.S. Pat. Nos. 3,028,365, 3,062,781 and 3,879,347 and in DE-OS 38 32 396 (Le A 26 344).

Branched polycarbonates are described, for example, in U.S. Pat. No. 4,185,009 and in DE-PS 2 500 092.

2. Thermoplastic aromatic polyesters in the context of the invention are those based on diphenols, aromatic dicarboxylic acid dichlorides, chain terminators and optionally branching agents.

Suitable diphenols are the compounds mentioned above for the production of the polycarbonates.

Monophenols are used as chain terminators while trisphenols and tetraphenols are used as branching agents.

In addition, aromatic tricarboxylic acid trichlorides or aromatic tetracarboxylic acid tetrachlorides or acid chlorides of even higher aromatic carboxylic acids may also be used with advantage as branching agents in this case.

They are used in quantities of 0.01 to ; mol-%, based on the aromatic dicarboxylic acid dichlorides used whereas phenolic branching agents are used in quantities of 0.01 to 1 mol-%, based on the diphenols used, for the production of the aromatic polyester.

Branching agents for the production of aromatic polyesters are described, for example, in DE-OS 2 940 024, pages 9/10 (Le A 19 932).

Suitable aromatic dicarboxylic acid dichlorides are terephthalic acid dichloride, isophthalic acid dichloride, o-phthalic acid dichloride, diphenyl dicarboxylic acid dichloride, diphenyl ether dicarboxylic acid dichloride, naphthalene dicarboxylic acid dichloride and mixtures thereof.

Preferred mixtures are mixtures of terephthalic.acid dichlorides with isophthalic acid dichlorides in a ratio of 20:1 to 1:20 and more particularly in a ratio of 7:3 to 3:7.

The production of the aromatic polyesters from acid chlorides, diphenols, chain terminators and optionally branching agents is preferably carried out in known manner by the interfacial polycondensation process (cf. for example DE-OS 2 940 024 and German patent application P 39 03 103.9 (Le A 26 313)).

3. Thermoplastic aromatic polyester carbonates in the context of the present invention are those obtainable in known manner from diphenols, phosgene, aromatic dicarboxylic acid dichlorides, chain terminators and optionally branching agents.

Polycarbonates and their production are known (cf. for example EP-OS 0 036 080, U.S. Pat. No. 3,169,121, DE-OS 2 714 544 and German patent application P 39 03 103.9 (Le A 26 313)).

Suitable diphenols are those already mentioned for the production of the polycarbonates.

Suitable aromatic dicarboxylic acid dichlorides are those already mentioned for the production of the aromatic polyesters, mixtures of terephthalic acid dichlorides with isophthalic acid dichlorides in the ratios already mentioned again being particularly suitable.

Suitable chain terminators are the monophenols which are also suitable for the production of polycarbonat.es and polyesters.

Suitable branching agents are the more than dihydric phenols and more than dibasic aromatic carboxylic acid chlorides mentioned above for the aromatic polyesters.

The aromatic polyester carbonates in the context of the present invention contain up to about 80 mol-% and preferably up to about 50 mol-% carbonate groups, based on the total mols of carbonate groups and aromatic carboxylic acid ester groups.

Both the ester component and the carbonate component of the aromatic polyester carbonates according to the invention may be present in the polycondensate in the form of blocks or in statistical distribution.

The relative viscosity ($\eta_{rel}$) of the aromatic polyesters and polyester carbonates is in the range from 1.18 to 1.4 and preferably in the range from 1.22 to 1.3 (as measured on solutions of 0.5 g polyester carbonate in 100 ml $CH_2Cl_2$ solution at 25° C.).

4. Thermoplastic polyamides suitable for the purposes of the present invention are, for example, nylon-6,6 obtained by condensation of hexamethylenediamine and adipic acid; nylon-6,10 produced from hexamethylenediamine and sebacic acid, polymes of ε-aminocaproic acid or ε-caprolactam, so-called nylon-6; polyamide 11, the self-condensation product of 1,1-aminoundecanoic acid; copolymers of hexamethylenediamine ε-caprolactam, adipic acid and sebacic acid; copolyamine, mers of hexamethylenediamine and adipic acid modified with formaldehyde and methanol; polyamides obtained by reaction of a linear diamine with dimeric acids which have been obtained from isobutylene dimers and also polyamides obtained from polymeric and saturated fatty acids and various polyamines.

All the polyamides suitable for the purposes of the invention should contain the

group as a bridge member in the main chain and should have average molecular weights ($\overline{M}w$, as determined by gel chromatography in m-cresol) in the range from 1,000 to 100,000 (for literature, cf. for example U.S. Pat. No. 3,431,224, column 3, lines 58 to 73).

Accordingly, the thermoplastic polyamides suitable for the purposes of the invention are known from the literature or may be obtained by methods known from the literature.

5. Thermoplastic polyalkylene glycol terephthalates in the context of the invention are, for example, those based on ethylene glycol, propane-1,3-diol, butane-1,4-diol, hexane-1,6-diol and 1,4-bis-hydroxymethyl cyclohexane. The molecular weights ($\overline{M}w$) of these polyalkylene glycol teremolecular phthalates are in the range from 10,000 to 80,000. The polyalkylene glycol terephthalates may be obtained by known methods, for example from terephthalic acid dialkyl ester and the corresponding diol by transesterification (cf. for example U.S. Pat. Nos. 2,647,885, 2,643,989, 2,534,028,.2,578,660, 2,742,494, 2,901,466).

For example, a lower alkyl ester of terephthalic acid, preferably the dimethyl ester, is transesterified with an excess of diol in the presence of suitable catalysts to form the bis-hydroxyalkyl ester of terephthalic acid. The temperature is increased from 140° C. to 210°–220° C. The alcohol released is distilled off. The condensation step is then carried out at temperatures of 210° to 280° C.; the pressure is lowered in stages to less than 1 torr, the excess diol being distilled off.

Accordingly, the thermoplastic polyalkylene glycol terephthalates suitable for the purposes of the invention are known from the literature or may be obtained by methods known from the literature.

6. Suitable polyarylene sulfones in the context of the invention have weight average molecular weights $\overline{M}w$ (as measured by the light scattering method in $CHCl_3$) in the range from 1,000 to 200,000 and preferably in the range from 20,000 to 60,000. Examples are the polyarylene sulfones of 4,4'-dichlorodiphenyl sulfone and a bisphenol obtainable by known methods, more particularly 2,2-bis-(4-hydroxyphenyl)-propane, with average weight average molecular weights (Mw) in the range from 2,000 to 200,000.

These polyarylene sulfones are known (cf. for example U.S. Pat. No. 3,264,536, DE-AS 1 794 171, GB-pS 1,264,900, U.S. Pat. No. 3,641,207, EP-A-0 038 028, DE-OS 3 601 419 and DE-OS 3 601 420). Suitable polyarylene sulfones may also be branched in known manner (cf. for example DE-OS 2 305 413).

7. Thermoplastic polyether ketones suitable for the purposes of the present invention are known from the literature (cf. for example GB-PS 1,078,234, U.S. Pat. No. 4,010,147 and EP-OS 0 135 938).

They contain the recurring structural element

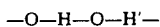

which —H'— is the two-bond moiety of a bis-aryl ketone and —O—H—O— is a two-bond diphenolate moiety.

They may be prepared from dialkali diphenolates of the formula Alkali—O—H—O—Alkali and bis-(haloaryl)-ketones having the formula Hal—H'—Hal (Hal=halogen), for example in accordance with GB-PS 1,078,234. A suitable dialkyl diphenolate is, for example, the dialkali diphenolate of 2,2-bis-(4-hydroxyphenyl)-propane while a suitable bis-(haloaryl)-ketone is the bis-(haloaryl)-ketone of 4,4'-dichlorobenzophenone.

8. Thermoplastic polyarylene sulfides suitable for the purposes of the invention may be linear or branched polyarylene sulfides. They contain structural units corresponding to the following general formula

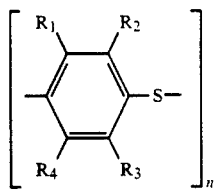

in which $R_1$ to $R_4$ independently of one another . . . or the same and represent $C_{1-6}$ alkyl, phenyl or hydrogen. The polyarylene sulfides may also contain diphenyl units.

Polyarylene sulfides and their production are known (cf. for example U.S. Pat. No. 3,354,129 and EP-OS 0 171 021 and the literature cited in EP-OS 0 171 021).

9. Thermoplastic polyphenylene oxides suitable for the of the invention are preferably poly-(2,6-dialkyl-1,4-phenylene oxides). Polyphenylene oxides suitable for the purposes of the invention have weight average molecular weights Mw (as measured by the light scattering method in chloroform) in the range from 2,000 to 100,000 and preferably in the range from 20,000 to 60,000. These polyphenylene oxides are known.

The preferred poly-(2,6-dialkyl-1,4-phenylene oxides) may be obtained in known manner by oxidizing condensation of 2,6-dialkyl phenols with oxygen in the presence of catalyst components of copper salts and tertiary amines (cf for example DE-OS 2 126 434 and U.S. Pat. No. 3,306,875).

Suitable poly-(2,6-dialkyl-1,4-phenylene oxides) are, in particular, poly-[2,6-di-($C_{1-4}$-alkyl)-1,4-phenylene oxides]such as for example poly-(2,6-dimethyl-1,4-phenylene oxide).

10. Styrene polymers suitable for the purposes of the invention are preferably thermoplastic copolymers of styrene and/or α-methyl styrene with acrylonitrile and/or with methacrylonitrile, 50 to 95 parts by weight styrene and/or o-methyl styrene and 50 to 5 parts by weight acrylonitrile and/or methacrylonitrile, based on 100 parts by weight copolymer, generally being copolymerized in the thermoplastic copolymers.

Preferred ratios by weight in the copolymer are 60–80 parts by weight styrene and/or α-methyl styrene to 40–20 parts by weight acrylonitrile and/or methacrylonitrile.

Thermoplastic copolymers such as these are known and may be prepared by radical polymerization, more particularly by emulsion, suspension, solution or bulk polymerization. The copolymers preferably have average molecular weights $\overline{M}w$ (weight average, as determined by light scattering or sedimentation) in the range from 15,000 to 200,000. The styrene polymers are known.

11. ABS graft polymers suitable for the purposes of the invention are, in the broadest sense, graft polymers of the vinyl monomers mentioned above in 10. on butadiene rubbers.

The carbonates of formula (I) according to the invention may be incorporated in the thermoplastics by mixing of the mixture components in the melt in mixers or kneaders and subsequent cooling and granulation of the melt or by extrusion of the melt of the mixture components under the effect of intense shear forces and subsequent granulation.

In special cases, for example where the carbonates according to the invention are incorporated in polycarbonates or polyester carbonates, mixing may also be carried out via solutions of the mixture components in suitable solvents, such as preferably $CH_2Cl_2$, chlorobenzene or mixtures thereof; the mixed solutions may then be concentrated by evaporation in known manner.

Accordingly, the present invention also relates to a process for the production of the mixtures according to the invention of
(A) the thermoplastics and
(B) the carbonates corresponding to formula (I), characterized in that components (A) and (B) are mixed in the melt in mixers or kneaders and subsequently cooled and granulated or in that components (A) and (B) are extruded under the effect of intense shear forces and subsequently granulated or in that components (A) and (B) are dissolved in suitable solvents and the mixed solutions are subsequently concentrated by evaporation in known manner.

Concentration of the mixed solutions by evaporation may be carried out, for example, in evaporation extruders, spray evaporators or thin-layer evaporators.

Thermoplastic aromatic polycarbonates with monohydroxyphenyl polystyrenes as chain terminators which, in particular, have an $\overline{M}w$ (weight average molecular weight, as determined in known manner by light scattering or gel chromatography after preliminary calibration) of at least 10,000, preferably in the range from 15,000 to 200,000 and more preferably in the range from 20,000 to 80,000 are described and claimed in earlier German patent application P 39 19 553.8 (Le A 26 531).

Accordingly, in the case of the carbonates of formula (I) with r=1 according to the invention, the Mw is limited to less than 10,000.

Other suitable additives may be incorporated in the mixtures according to the invention of the thermoplastics and the carbonates corresponding to formula (I) at the same time as, before or after addition of the carbonates. Suitable additives are understood to be additives of the type which are typically used for the particular thermoplastics, i.e. are familiar to the expert.

Suitable additives are, for example, stabilizers, flameproofing agents, mold release agents, antistatic agents, pigments and UV absorbers.

Accordingly, the present invention also relates to mixtures containing (A) thermoplastics in quantities of 99.99% by weight to 70% by weight, preferably in quantities of 99.5% by weight to 80% by weight and more preferably in quantities of 99% by weight to 95% by weight and (B) carbonates corresponding to formula (I) in quantities of 0.01% by weight to 30% by weight, preferably in quantities of 0.5% by weight to 20% by weight and more preferably in quantities of 1% by weight to 5% by weight, based on 100% by weight of the sum of (A) +(B), and at least (C) one additive selected from the group consisting of stabilizers, flameproofing agents, mold release agents, antistatic agents, pigments and UV absorbers.

Accordingly, the present invention also relates to a process for the production of the mixtures according to the invention of (A) the thermoplastics, (B) the carbonates corresponding to formula (I) and (C) at least one additive selected from stabilizers, flameproofing agents, mold release agents, antistatic agents, pigments and UV absorbers, characterized in that the thermoplastics (A) are mixed with the carbonates (B) corresponding to formula (I) and at least one additive (C) in the melt at temperatures of 260 to 360.C and the resulting mixture is extruded.

The mixtures according to the invention of (A) thermoLe plastics, (B) carbonates corresponding to formula (I) and (C) optionally the other suitable additives may be processed in known manner to moldings of various kinds, for example to sheets or injection-molded articles.

This may be done in standard machines, such as extruders or injection-molding machines.

The moldings may be used, for example, when the particular thermoplastics have to be formed into complicated or thin-walled moldings, i.e. when the melt of the particIO ular thermoplastics is required to show good flow behavior. This may be necessary, for example, in the production of moldings for the electrical field or for the automotive field.

I. Preparation of monofunctional polystyrenes terminated by phenolio hydroxyl groups

Example I 1)

36 ml n-butyl lithium (2.5 molar solution in hexane) are added with stirring at room temperature in a nitrogen atmosphere to a mixture of 6,000 ml toluene and 900 g (8.65 mol) styrene. After a polymerization time of 2 h, 30 g (0.138 mol) of the sodium phenolate of 4-hydroxy-1,1-diphenyl ethylene in approx. 55 ml tetrahydrofuran were added to the orange-red polystyryl lithium solution. The solution became dark red in color. After a reaction time of 2 h, 30 ml methanol/1-molar phosphoric acid (1:1) (nitrogensaturated) were added. The polymer was recovered by precipitation in methanol, filtration and subsequent drying. The yield was 870 g.

$M_n$ (theoretical) =10,000 g/mol (calculated from the monomer and initiator concentration)

Example I 2)

60 ml n-butyl lithium (2.5 molar solution in hexane) were added with stirring at room temperature in a nitrogen atmosphere to a mixture of 500 ml toluene and 1,000 g (9.62 mol) styrene. After a polymerization time of 2 h, 60 g (0.223 mol) 4-trimethyl silyloxy-1,1-diphenyl ethylene in 50 ml toluene were added to the orange-red polystyryl lithium solution. The solution became dark red in color. After a reaction time of 1 h, 10 ml methanol (nitrogen-saturated) were added. The polymer was isolated by precipitation in methanol.

For cleavage of the silyl ether, the polymer was dissolved in approx. 3,ooo ml tetrahydrofuran/200 ml 1molar methanol hydrochloric acid and the resulting solution refluxed for 1 h. The polymer was isolated by precipitation in methanol, washing until neutral and drying. The yield was 940 g.

$M_n$=7300 g/mol (GPC analysis after calibration with styrene)

Example I 3)

80 ml n-butyl lithium (2.5 molar solution in hexane) were added with stirring at room temperature in a nitrogen atmosphere to a mixture of 2,000 ml toluene and 500 g (4.81 mol) styrene. After a polymerization time of 2 h, 50 g (o.23 mol) of the sodium phenolate of 4-hydroxy-1,1-diphenyl ethylene in approx. 100 ml tetrahydrofuran were added to the orange-red polystyryl lithium solution. The solution became dark red in color. After a reaction time of 2 h, 20 ml methanol/1-molar phosphoric acid (1:1) (nitrogen-saturated) were added. The polymer was recovered by precipitation in methanol, filtration and subsequent drying. The yield was 445 g.

$M_n$ (theoretical) =2,500 g/mol (calculated from the monomer and initiator concentration)

Example I 4)

80 ml n-butyl lithium (2.5 molar solution in hexane) were added with stirring at room temperature in a nitrogen atmosphere to a mixture of 6,000 ml toluene and 1,000 g (9.62 mol) styrene. After a polymerization time of 2 h, 50 g (0.23 mol) of the sodium phenolate of 4-hydroxy-1,1-diphenyl ethylene in approx. 100 ml tetrahydrofuran were added to the orange-red polystyryl lithium solution. The solution became dark red in color. After a reaction time of 2 h, 3o ml methanol/1-molar phosphoric acid (1:1) (nitrogen-saturated) were added. The polymer was recovered by precipitation in methanol, filtration and subsequent drying. The yield was 985 g.

$M_n$ (theoretical) = 5,000 g/mol (calculated from the monomer and initiator concentration)

Preparation of a monofunctional poly-p-methyl styrene terminated by a phenolic hydroxyl group

Example I 5)

20 ml n-butyl lithium (2.5 molar solution in hexane) were added with stirring at room temperature in a nitrogen atmosphere to a mixture of 2,400 ml toluene and 400 g (8.65 mol) p-methyl styrene. After a polymerization time of 2 h, 20 g (0.092 mol) of the sodium phenolate of 4-hydroxy-1,1-diphenyl ethylene in approx. 35 ml tetrahydrofuran were added to the orange-red polystyryl lithium solution. The solution became dark red in color. After a reaction time of 2 h, 5 ml methanol/1-molar phosphoric acid (1:1) (nitrogen-saturated) were added. The polymer was recovered by precipitation in methanol, filtration and subsequent drying. The yield was 400 g.

$M_n$ (theoretical) = 8,000 g/mol (calculated from the monomer and initiator concentration)

II. Preparation of the dipolystyrene carbonates and dipolystyrene carbonic acid esters

Example II 1)

250 g (0.05 mol) of the product I 4) are dissolved in 600 ml methylene chloride. 50 g 40% sodium hydroxide solution and 200 g water are then added, followed by vigorous stirring in an inert gas atmosphere. 19.8 g (0.20 mol) phosgene are then introduced over a period of 30 minutes at 20 to 25 C. After 5 minutes, 0.2 ml N-ethyl piperidine is added and the mixture is stirred for another 45 minutes. The aqueous phase is separated off, the organic phase is acidified with 10% phosphoric acid, washed with water until neutral, dried over sodium sulfate and freed from solvent. Phenolic OH by back-titration using the titanium tetrachloride method <0.005%.

IR (cm$^{-1}$): 3025 (arom. C-H-stretching vibration); 1942, A 1870, 1800 and 1740 (arom. combination vibration); 1776 (C=O-stretching vibrations); 1601 and 1583 (arom. C=C-stretching vibration).

Example II 2)

As in Example II 1), 500 g of product I were reacted to the corresponding dipolystyrene carbonate. Phenolic OH by back-titration using the titanium tetrachloride <0.009%.

Example II 3)

As in Example II 1), 350 g of product I 2) were reacted to the corresponding dipolystyrene carbonate.

Example II 4)

As in Example II 1), 125 g of product I 3) were reacted to the corresponding dipolystyrene carbonate.

Example II 5)

As in Example II 1), 400 g of product I 5) were reacted to the corresponding dipolystyrene carbonate.

Example II 6)

10 6.60 g (0.02 mol) of the bis-chlorocarbonic acid ester of 2,2-bis-(4,4'-hydroxyphenyl)-propane and 9.48 g pyridine are dissolved in 200 ml methylene chloride. 200 g (0.04 mol) of product I 4) dissolved in 300 ml methylene chloride are then added dropwise at 20° to 30° C. while inert gas is introduced. After neutralization with 10% hydrochloric acid at 0° C., the aqueous phase is separated off and the organic phase is washed with water. After drying of the organic phase over sodium sulfate, the solvent is removed in vacuo at 120° C.

Phenolic OH by back-titration using the titanium tetrachloride method: 0.003 to 0.005%.

IR (cm$^{-1}$): 3025 (arom. C—H-stretching vibration); 1940, 1870, 1800 and 1740 (arom. combination vibrations); 1770 (C=O-stretching vibration); 1601 and 1580 (arom. C=C stretching vibration).

III. Preparation of the polymer mixtures in solution

The following polymers IIIa, IIIb and IIIc (95.0 g of each) were mixed with 5.0 g of product II 3) in solution to yield Examples III 1), III 2) and III 3).

IIIa)

Homopolycarbonate of 2,2-bis-(4-hydroxyphenyl)-propane, relative solution viscosity 1.28 (0.05 g/l, as measured in methylene chloride at 25° C.), gives III 1).

IIIb)

Homopolycarbonate of 1,1-bis-(4-hydroxyphenyl)-3,3,5-trimethyl cyclohexane, relative solution viscosity 1.30 (0.05 g/l, as measured in methylene chloride at 25.C), gives III 2).

IIIc)

Aromatic polyester carbonate prepared from 80 mol-% polybutylene terephthalate and 20 mol-% bisphenol A with phosgene as carbonate donor gives III 3).

Example III 4)

As in Example III 1), but with 5.0 g of product II 2).

Example III 5)

As in Example III 1), but with 5.0 g of product II 1).

Example III 6)

As in Example III 1), but with 5.0 g of product II 4).

Example III 7)

As in Example III I), but with 5.0 g of product II 5).

Example III 8)

As in Example III 1), but with 5.0 g of product II 6).

Example III 9)

As in Example III 2), but with 95.0 g of product III b) and 5.0 g of product II 1).

Example III 10)

As in Example III 3), but with 95.0 g of product III c) and 5.0 g of product II 1).

Methylene chloride was used as solvent, b®ing removed by evaporation after mixing of the substances mentioned in the Examples.

IV. Compounding of the dipolystyrene carbonates with thermoplastics by melt extrusion The following polymers were compounded with product II 1) by melt extrusion:
(a) homopolycarbonate of 2,2-bis-(4-hydroxyphenyl)-propane, relative solution viscosity 1.28 (0.05 g/l, as measured in methylene chloride at 25.C)
(b) polyamide-6
(c) polyamide-6,6
(d) polybutylene terephthalate
(e) polyether sulfone, relative solution viscosity 1.368, as measured on 0.5 g polyether sulfone in 100 ml $CH_2Cl_2$ at 25° C.
(f) polyether ether ketone prepared from difluorobenzophenone, hydroquinone and diphenyl sulfone, relative solution viscosity 2.213 (as measured at a concentration of 0.1 g/l in concentrated $H_2SO_4$).

Example IV 1)

1,900 g of polymer a) and 100 g of product II 1) are compounded by melt extrusion in a screw at 300° C.

Example IV 2)

1.950 g of polymer a) and 50 g of product II 1) are compounded by melt extrusion in a screw at 300° C.

Example IV 3)

As in Example IV 2), polymer b) instead of polymer a) was compounded with 50 g of product 11 1) at 300° C.

Example IV 4)

As in Example IV 2), polymer c) instead of polymer a) was compounded with 50 g of product II 1) at 300+ C.

Example IV 5)

As in Example IV 2), polymer d) instead of polymer a) was compounded with 50 g of product II 1) at 300° C.

Example IV 6)

As in Example IV 2), polymer e) instead of polymer a) was compounded with 50 g of product II 1) at 340° C.

Example IV 7)

As in Example IV 2), polymer f) instead of polymer a) was compounded with 50 g of product II 1) at 350° C.

V Melt viscosity of the solution compounds

| Product of Example No. | 1,000 | 1,500 $s^{-1}$ |
|---|---|---|
| | Melt viscosity in Pa · s at 300° C. | |
| III a) | 467 | 371 (Comparison Example) |
| III 1) | 90 | 71 |
| III 2) | 189 | 161 |
| III 3) | 246 | 220 |
| III 4) | 87 | 76 |
| III 5) | 100 | 82 |
| III 6) | 103 | 85 |
| III 7) | 85 | 72 |
| III 8) | 139 | 112 |
| | Melt viscosity in Pa · s at 340° C. | |
| III b) | 579 | — (Comparison Example) |
| III 9) | 210 | 187 |
| | Melt viscosity in Pa · s at 360° C. | |
| III c) | 428 | 347 (Comparison Example) |
| III 10) | 68 | 56 |

VI. Melt viscosity of the extrudates

| Product of Example No. | 1,000 | 1,500 $s^{-1}$ |
|---|---|---|
| | Melt viscosity in Pa · s at 300° C. | |
| IV a) | 467 | 371 (Comparison Example) |
| IV 1) | 119 | 99 |
| IV 2) | 183 | 165 |
| IV b) | 34 | 32 (Comparison Example) |
| IV 3) | 26 | 24 |
| IV c) | 59 | 54 (Comparison Example) |
| IV 4) | 33 | 27 |
| IV d) | 44 | 43 (Comparison Example) |
| IV 5) | 24 | 22 |
| | Melt viscosity in Pa · s at 340° C. | |
| IV e) | 832 | 611 (Comparison Example) |
| IV 6) | 129 | 109 |
| | Melt viscosity in Pa · s at 360° C. | |
| IV f) | 347 | 289 (Comparison Example) |
| IV 7) | 202 | 171 |

What is claimed is:
1. A carbonate corresponding to formula (I)

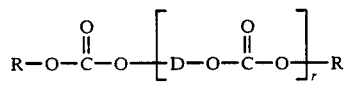

in which R corresponds to

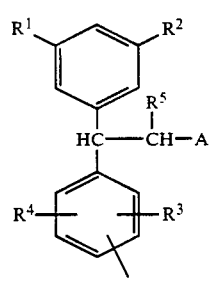

wherein
A is a polymer of anionically polymerizable vinyl compounds having an number average molecular weight of 1,000 to 50,000,
$R^1$ and $R^2$ represent H, $C_{1-4}$ alkyl or $CH_2$—O—,
$R^3$ represents H or $C_{1-4}$ alkyl, O—$C_{1-4}$-alkyl,
$R^4$ represents H, $C_{1-4}$ alkyl and
$R^5$ represents H or $C_{1-4}$ alkyl.
where —O—D—O— is a diphenolate moiety in which —D— is a divalent group containing 6 to 30 carbon atoms and where r is 0 or 1 with the proviso that where r is 1, the weight average molecular weight of said carbonate is below 10,000.

2. A thermoplastic composition having an improved melt flow comprising
(A) 99.99 to 70 percent of thermoplastic resin and
(B) 0.01 to 30 percent of a carbonate conforming to

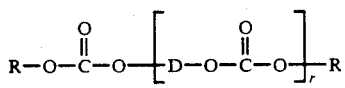

wherein R corresponds to

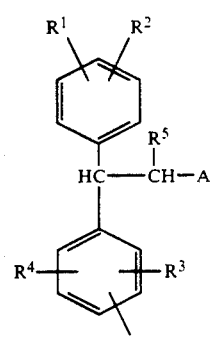

wherein
A is a polymer of anionically polymerized vinyl compounds having an number average molecular we4ight of 1,000 to 50,000,
$R^1$ and $R^2$ represent H, $C_{1-4}$ alkyl or $CH_2$—O—,
$R^3$ represents H or $C_{1-4}$ alkyl, O—$C_{1-4}$-alkyl,
$R^4$ represents H, $C_{1-4}$ alkyl and
$R^5$ represents H or $C_{1-4}$ alkyl.
where —O—D—O— is a diphenolate moiety in which —D— is a divalent group containing 6 to 30 carbon atoms and where r is 0 or 1 with the proviso that where r is 1, the weight average molecular weight of said carbonate is below 10,000.

3. A method for increasing the flow of a thermoplastic material comprising adding to said material an additive amount of the carbonate of claim 1.

4. The composition of claim 2 further comprising at least one additive selected from stabilizers, flameproofing agents, mold release agents, antistatic agents, pigments and UV absorbers.

5. The carbonate of claim 1 wherein said —D— is mononuclear or polynuclear.

6. The carbonate of claim 5 wherein said —D— is substituted by alkyl radicals.

7. The carbonate of claim 6 wherein said alkyl is methyl.

8. The carbonate of claim 1 wherein said —D— is a bridged polynuclear group.

9. The carbonate of claim 1 wherein said —D— is a fused polynuclear group.

10. The composition of claim 2 wherein said —D— is mononuclear or polynuclear.

11. The composition of claim 10 wherein said —D— is substituted by alkyl radicals.

12. The composition of claim 11 wherein said alkyl is methyl.

13. The composition of claim 9 wherein said —D— is a bridge polynuclear group.

14. The composition of claim 9 wherein said —D— is a fused polynuclear group.

* * * * *